United States Patent
Ravikumar et al.

(10) Patent No.: US 6,848,718 B2
(45) Date of Patent: Feb. 1, 2005

(54) SKI CADDY HAVING MEANS FOR UTILIZING SKI POLES AS A SUPPORT

(75) Inventors: Sundaram Ravikumar, Briarcliff Manor, NY (US); John Rutkowski, Jackson, NJ (US)

(73) Assignee: Arvik Enterprises, LLC, Dobbs Ferry, NY (US)

( * ) Notice: Subject to any disclaimer, the term of this patent is extended or adjusted under 35 U.S.C. 154(b) by 22 days.

(21) Appl. No.: 10/365,041

(22) Filed: Feb. 12, 2003

(65) Prior Publication Data

US 2004/0155417 A1 Aug. 12, 2004

(51) Int. Cl.⁷ .............................................. A63C 11/10
(52) U.S. Cl. ..................... 280/814; 280/47.18; 280/35; 280/809; 280/655
(58) Field of Search .......................... 280/35, 809, 814, 280/39, 40, 645, 646, 652, 655, 641, 47.315, 47.18, 47.19, 47.26, 47.28, 47.29, DIG. 6, 42; 224/42.03, 324, 917

(56) References Cited

U.S. PATENT DOCUMENTS

| | | | | |
|---|---|---|---|---|
| 3,504,921 A | * | 4/1970 | Osmond | 280/8 |
| 3,753,359 A | | 8/1973 | Frey | 70/19 |
| 3,779,568 A | * | 12/1973 | Wakabayashi | 280/9 |
| 4,114,915 A | * | 9/1978 | Lello et al. | 280/47.19 |
| 4,268,050 A | * | 5/1981 | Kennedy, Sr. | 280/38 |
| 4,358,137 A | * | 11/1982 | Gramm | 280/814 |
| 4,666,184 A | * | 5/1987 | Garvey, Jr. | 280/814 |
| 4,792,159 A | | 12/1988 | Garvey, Jr. et al. | 280/814 |
| 4,856,811 A | * | 8/1989 | Bressler et al. | 280/652 |
| 5,106,112 A | * | 4/1992 | Sargent | 280/40 |
| 5,240,285 A | * | 8/1993 | Harris | 280/814 |
| 5,288,090 A | * | 2/1994 | Bross | 280/79.7 |
| 5,340,153 A | * | 8/1994 | Parker | 280/814 |
| 5,639,122 A | * | 6/1997 | Churchill | 280/814 |
| 6,070,906 A | * | 6/2000 | Allen | 280/814 |
| 6,086,102 A | * | 7/2000 | Stark et al. | 280/814 |
| 6,371,346 B1 | * | 4/2002 | Sharma | 224/578 |
| 6,659,316 B2 | * | 12/2003 | Fleming et al. | 224/0.5 |

\* cited by examiner

*Primary Examiner*—Christopher P. Ellis
*Assistant Examiner*—J. Allen Shriver
(74) *Attorney, Agent, or Firm*—Gordon & Jacobson, PC

(57) ABSTRACT

A ski caddy includes a telescoping shaft coupled to a pair of wheels at one end and a handle at the other. The wheels are preferably dish shaped. A generally U-shaped cup resides between the wheels for holding the butt end of a pair of skis. A generally W-shaped member is provided beneath the handle to support the skis in the space the skis in the space between the front and rear boot bindings. Two cutouts, adapted to receive the upper portion of a pair of ski poles, are provided on each opposite side of the W-shaped member and allow the poles to be rotated and crossed into a tripod-like configuration with the shaft. A pair of pole receiving sleeves are provided on opposite sides of the U-shaped cup for receiving the sharp ends of the ski poles. The ski caddy moves easily through snow and on hard surfaces, and can be maintained in an upright position on virtually any surface. The ski caddy can be secured to a stationary object using a cable lock passing it through the holes in the cutouts and the W-shaped support.

10 Claims, 7 Drawing Sheets

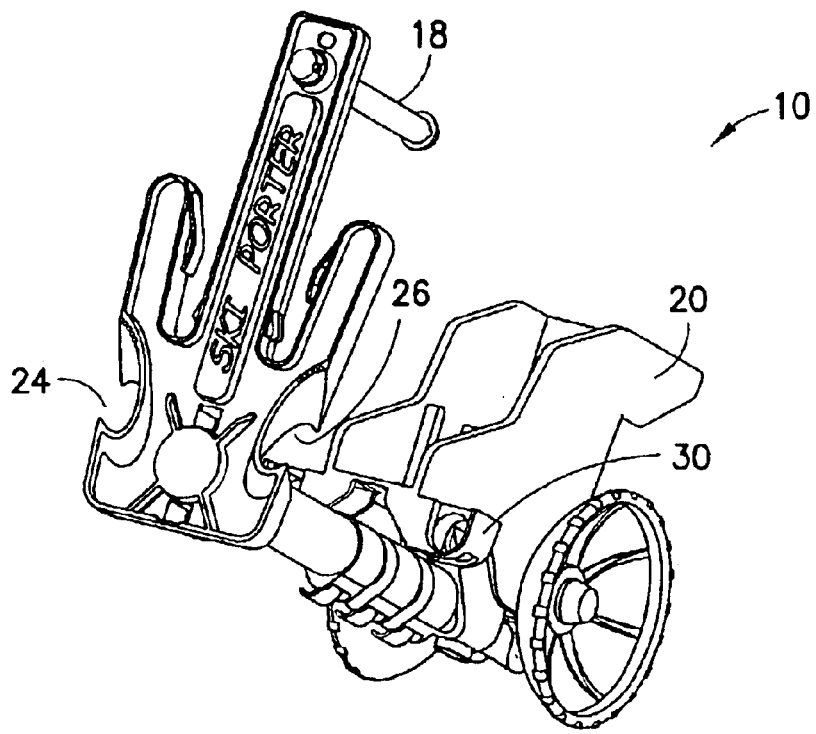
FIG.4
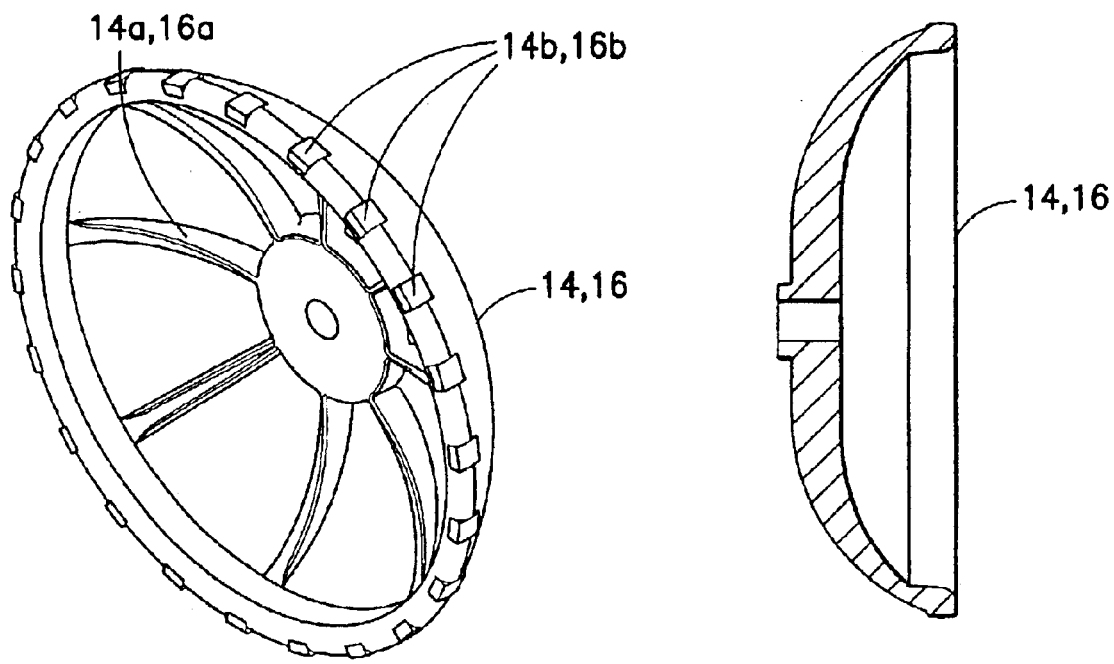
FIG.5
FIG.6

SKI CADDY HAVING MEANS FOR UTILIZING SKI POLES AS A SUPPORT

BACKGROUND OF THE INVENTION

1. Field of the Invention

The invention relates to an apparatus for carrying a pair of skis with a pair of ski poles. More particularly, the invention relates to a ski caddy apparatus wherein the ski poles rotate from a transport position to a support position.

2. State of the Art

Ski equipment generally includes skis, poles, and boots along with certain apparel. Skis and poles are usually attached to the roof of a car using a locking roof rack so that they may be transported to a ski area. Typically, the car must be parked a substantial distance from the actual ski area. Thus, the skis and poles must be carried from the car to the ski area. Depending on how far the distance is to the ski area, it may be desirable to carry the boots rather than wear them, since walking in ski boots can be uncomfortable. However, in many if not most cases, skiers don their boots at the car and wear them as they carry skis and Over the last few decades, a number of devices have become available for use by skiers to transport their equipment. Typically, these devices have means for carrying both skis, ski poles, and on occasion, the ski boots. Many of these devices are quite bulky since they are at least as long as the skis themselves. Some, though not all, provide security devices such that the ski equipment and the carrier may be locked to a stationary object at a ski lodge. This is desirable, for example, when a skier breaks for lunch and leaves the ski equipment unattended outside the lodge.

U.S. Pat. No. 3,504,921 issued on Apr. 7, 1970 to Osmond discloses an apparatus for carrying two pairs of skis and ski poles. The device includes a relatively wide frame having wheels at one end and a handle at the other. The two pairs of skis are mounted parallel and spaced apart with the ski poles being mounted between the ski pairs. The skis and poles are fastened to the device with elastic straps. The wheels are surrounded by small ski tips so that the device can be moved through soft snow without the wheels bogging down. The handle is pivotally coupled to the device so that it can be rotated into a support position with the skis and poles being elevated approximately 45°. As such, the handle is relatively long. In sum, the entire apparatus is very large both in length and width. There is also no particular provision for securing and locking the ski equipment device to a stationary object at a ski lodge.

U.S. Pat. No. 4,114,915, issued Sep. 19, 1978 to Lello et al., discloses a ski caddy for carrying a pair of skis, boots and poles. The device includes a telescoping frame with wheels at one end and a handle at the other end. A small "foot" extends between the wheels. The foot is intended to support the device in a vertical position. However, it can easily be appreciated that the foot will not work to support the device on soft snow. Moreover, although the device can be collapsed to a smaller length, its width cannot be changed. Further, the wheels are narrow enough that they will easily get bogged down in soft snow. There is also no particular provision for securing and locking the ski equipment device to a stationary object at a ski lodge.

U.S. Pat. No. 4,856,811, issued Aug. 15, 1989 to Bressler et al., discloses a device for transporting ski equipment. The device is a collapsible wire frame similar to a shopping cart in construction. It has wheels at one end and a handle at the other end. Two legs may be pulled away from the main frame to support the frame in a generally inverted V form. However, because the legs are made of thin wire, they will only work on very hard snow. The wheels suffer the same disadvantage that they will not work in soft snow. In general, the entire design is a relatively complex web of bent and pivoting wire which is likely difficult to manufacture and non-intuitive to use. Although there appears to be a provision for locking ski equipment to the device, there is no specific provision for locking the device to a stationary object at a ski lodge.

U.S. Pat. No. 5,106,112, issued Apr. 21, 1992 to Sargent, discloses a ski equipment transport device which includes a telescoping tubular frame similar in construction to that of a luggage carrier. The frame has wheels at one end and a handle at the other. The wheels are mounted on half axles, one of which is pivotable from a position coaxial with the other axle to a position perpendicular to the other axle. This forms an L shaped foot print which is capable of supporting the unit precariously on a flat hard surface. It is easy to see however that the device will not remain standing on a slope, in soft snow, or in windy conditions. The wheels on this device also appear to be easily bogged down in anything but the hardest snow. Although it is stated that the device can be positioned in an equipment locker, there is no independent provision for locking the device and the ski equipment to a stationary object at a ski lodge.

U.S. Pat. No. 5,340,153, issued Aug. 23, 1994 to Parker, discloses a ski transport dolly which has separate handle and wheeled components each of which must be clamped to the skis being carried. The device can accommodate two pairs of skis, poles and boots. However, it is easy to see that attaching the device to skis, poles and boots is very tedious. There is no provision for supporting the device in an upright position. There is no locking provision and the wheels are so narrow that they will be immediately bogged down on all but the hardest of surfaces. Although a hole is provided for locking the device to a stationary object with a cable lock, there is no means to secure the ski equipment from theft.

SUMMARY OF THE INVENTION

It is therefore an object of the invention to provide an apparatus for transporting ski equipment.

It is also an object of the invention to provide an apparatus for transporting ski equipment which will roll on a hard surface but which will not get bogged down in soft snow.

It is another object of the invention to provide an apparatus for transporting ski equipment which can be made to stand elevated on inclined surfaces, on soft snow, and in windy conditions.

It is still another object of the invention to provide an apparatus for transporting ski equipment which can be used to secure the apparatus and the ski equipment to a stationary object.

It is also an object of the invention to provide an apparatus for transporting ski equipment which can be collapsed to a compact configuration.

In accord with these objects which will be discussed in detail below, the ski caddy according to the invention includes a telescoping shaft coupled to a pair of wheels at one end and a handle at the other. The wheels are preferably dish shaped so that they act like plows in soft snow. A generally U-shaped cup resides between the wheels for holding the butt end of a pair of skis. A generally W-shaped member is provided beneath the handle to support the skis near their tips. Two cutouts are provided on each opposite side of the W-shaped members beneath the ski supports. The cutouts are adapted to receive the upper portion of a pair of ski poles. A pair of pole receiving cups are provided on opposite sides of the U-shaped cup for receiving the sharp ends of the ski poles. According to the presently preferred embodiment, the cutouts are angled in two planes so that the ski poles and be rotated and crossed to form a tripod-like structure with the telescoping shaft. A sliding handle is coupled to the center of the W-shaped member.

The ski caddy according to the invention moves easily through the snow or on hard surfaces. It can be maintained in an upright position on virtually any surface by rotating and crossing the ski poles so that the tips of the ski poles extend out and away from the shaft thereby forming a tripod-like configuration. The ski caddy can be secured to a stationary object using a cable lock.

Additional objects and advantages of the invention will become apparent to those skilled in the art upon reference to the detailed description taken in conjunction with the provided figures.

BRIEF DESCRIPTION OF THE DRAWINGS

FIG. 4 is a view similar to FIG. 3 but with the telescoping shaft fully compacted;

FIG. 5 is a perspective view of a preferred wheel;

FIG. 6 is a diametrical section of the wheel of FIG. 5;

DETAILED DESCRIPTION OF THE PREFERRED EMBODIMENTS

Figure 1:
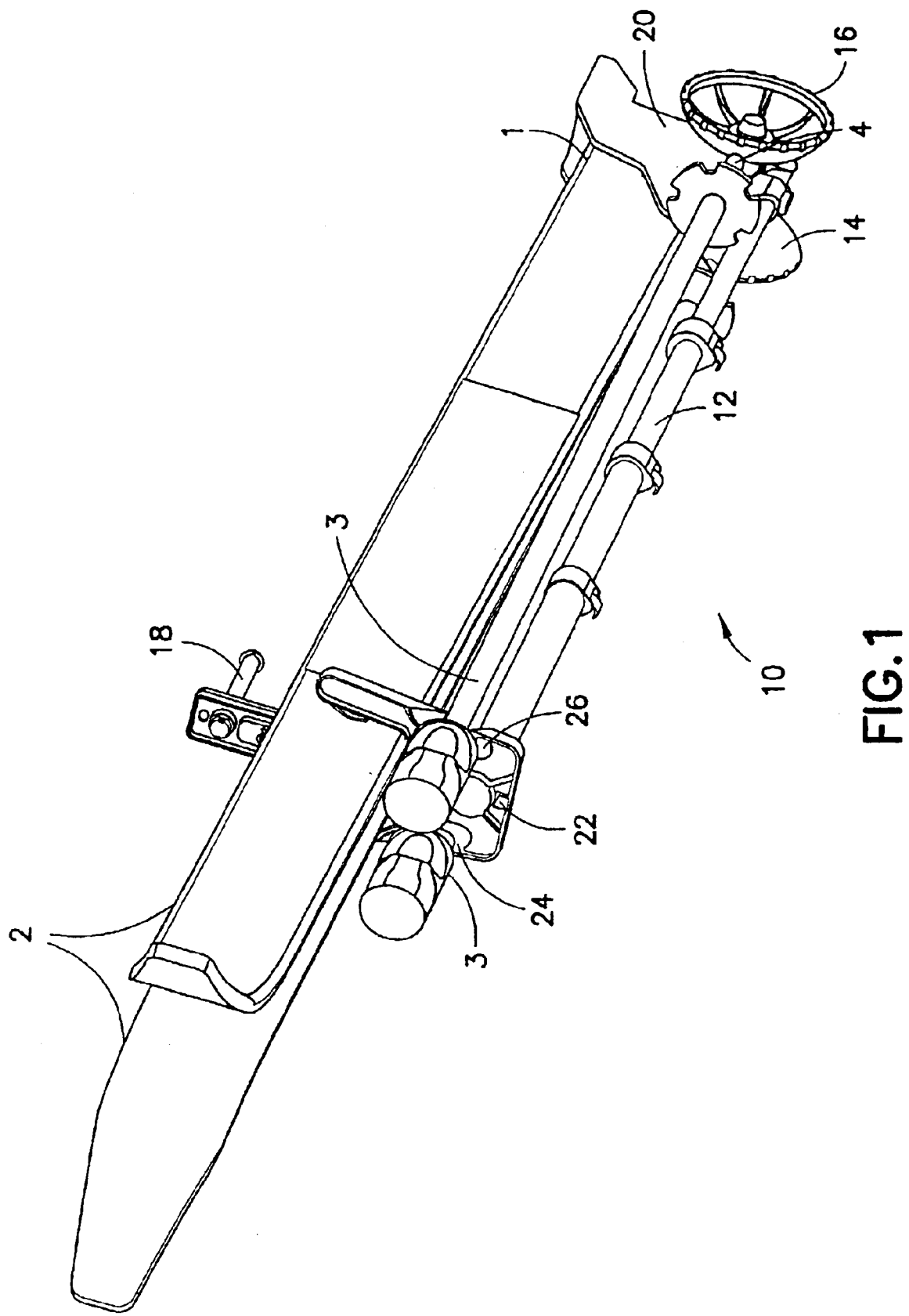
FIG. 1 is a perspective view illustrating the ski caddy expanded, loaded with skis and poles with the handle extended away from the ski tips.

Referring now to the Figures generally, the ski caddy 10 according to the invention includes a telescoping shaft 12 coupled to a pair of wheels 14, 16 at one end and a handle 18 at the other end. The wheels 14, 16 are preferably dish shaped as shown and described below with reference to FIGS. 5 and 6 so that they act like plows in soft snow.

A generally U-shaped cup 20 resides between the wheels 14, 16 for holding the butt ends 1 of a pair of skis. A generally W-shaped member 22 is provided beneath the handle 18 to support the skis near their tips 2.

Figure 2:
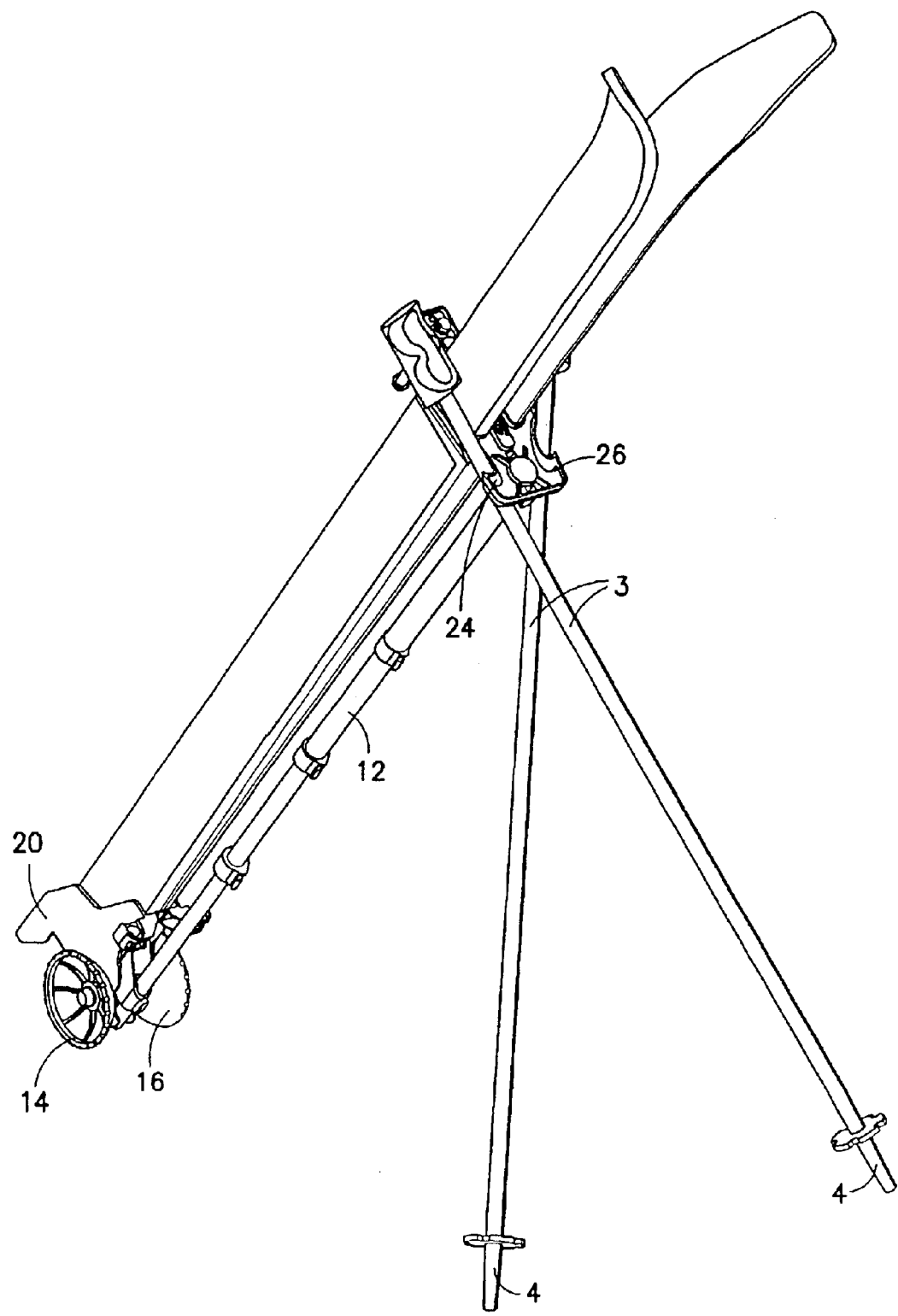
FIG. 2 is a view similar to FIG. 1 illustrating the ski poles rotated and crossed with the assembly assuming a tripod-like configuration.
Figure 3:
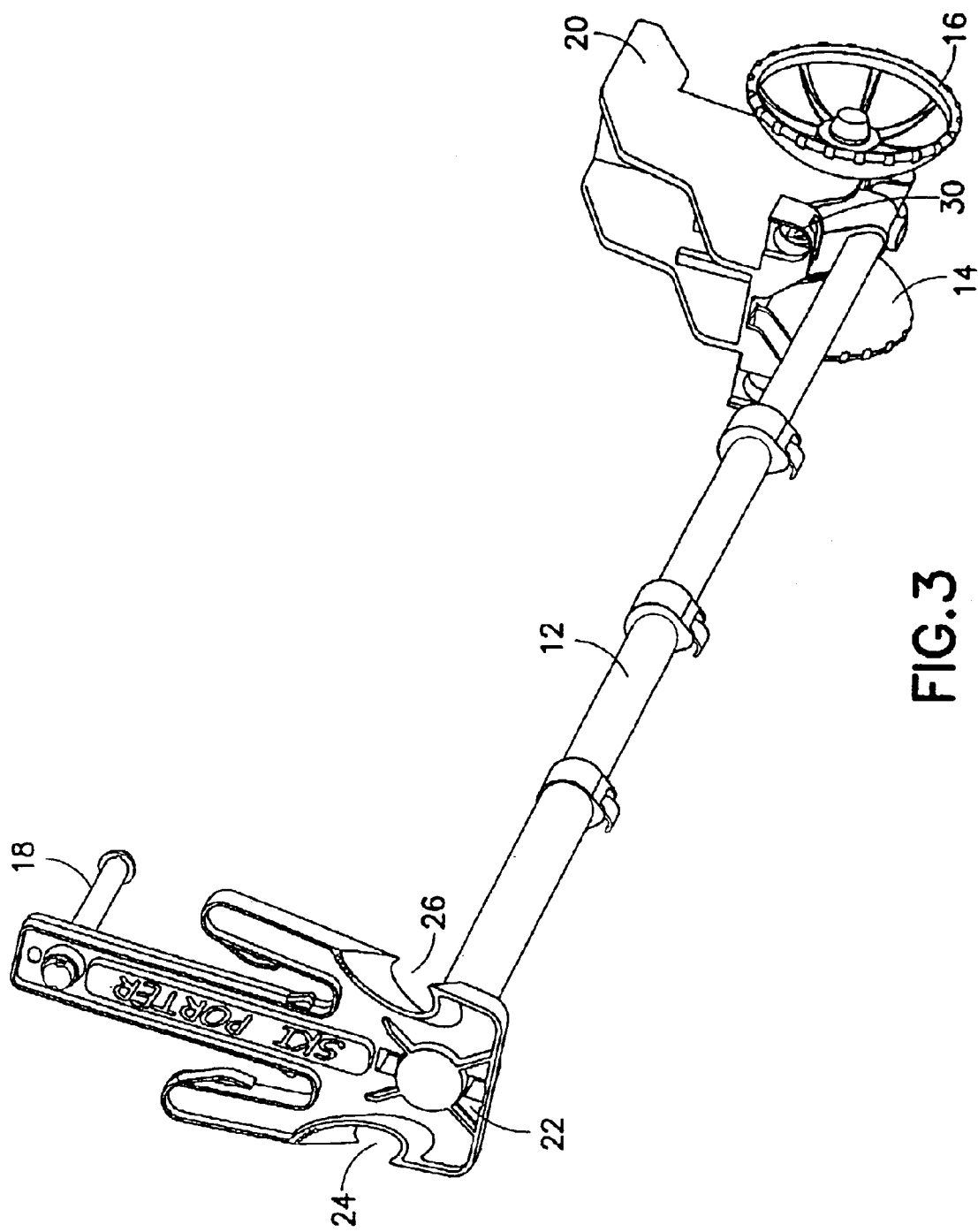
FIG. 3 is a perspective view of the ski caddy with the skis and poles removed but with the telescoping shaft still expanded.

Two cutouts 24, 26 (seen best in FIGS. 3 and 9) are provided on each opposite side of the W-shaped member 22 beneath the ski supports. The cutouts 24, 26 are adapted to receive the upper portions 3 of a pair of ski poles as seen best in FIGS. 1 and 2. A pair of pole receiving cups or sleeves 28, 30 (seen best in FIG. 8) are provided on opposite sides of the U-shaped cup 20 for receiving the sharp ends 4 (FIGS. 1 and 2) of the ski poles.

According to the presently preferred embodiment, the cutouts 24, 26 and the upper portion of the W-shaped member 22 are provided with holes (not shown) for receiving the cable lock (not shown).

The handle 18 is preferably a sliding handle coupled to the center of the W-shaped member 22 and is movable towards and away from the tips 5 of the skis.

The ski caddy 10 according to the invention moves easily through the snow or on hard surfaces. It can be maintained in an upright position on virtually any surface by rotating and crossing ski poles so that the tips of the ski poles extend out and away from the shaft thereby forming a tripod-like configuration. The ski caddy can be secured to a stationary object using a cable lock (not shown).

According to the presently preferred embodiment, the telescoping shaft 12 is substantially circular in cross section and is made of four coaxial pieces. Three pieces are provided with quick release locks of the type used on many camera tripods. The ski caddy is thereby adjustable to fit different length skis and may be collapsed as shown in FIG. 4 for compact storage.

FIGS. 5 and 6 illustrate a preferred embodiment of wheels 14, 16. The wheels are generally dish shaped with a plurality of radial ribs 14a, 16a and a plurality of circumferential teeth 14b, 16b. These enable the wheels to travel well on soft and hard surfaces.

Figure 7:
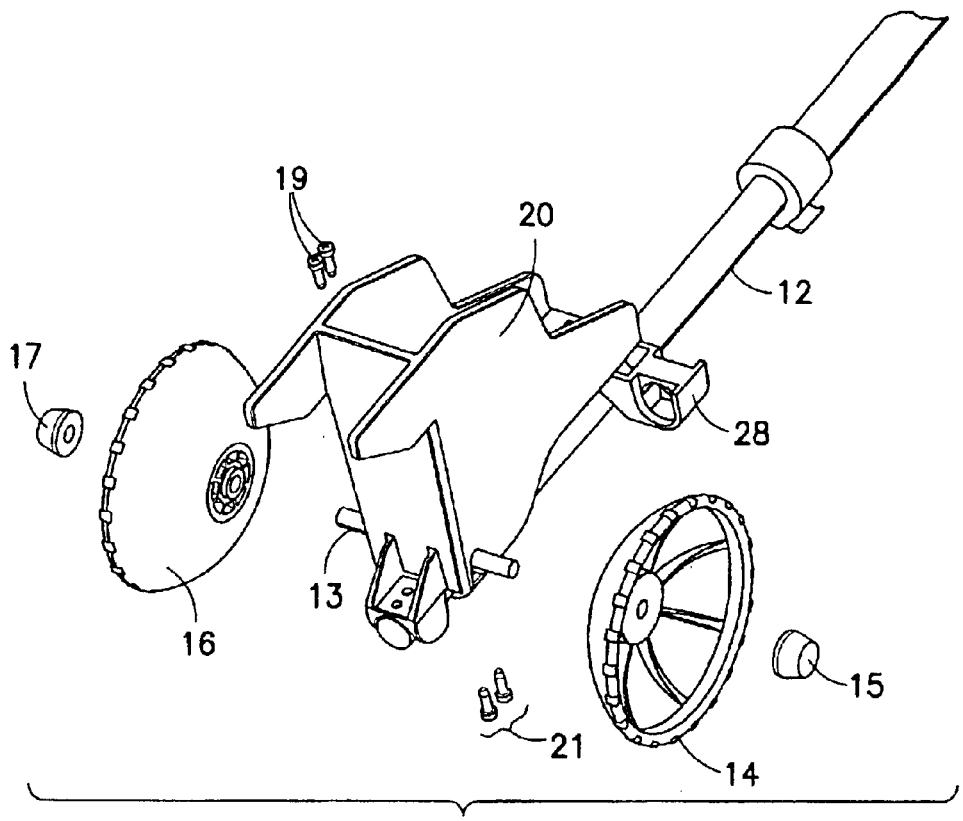
FIGS. 7 and 8 are broken exploded perspective views illustrating the wheel and cup assembly.
Figure 8:
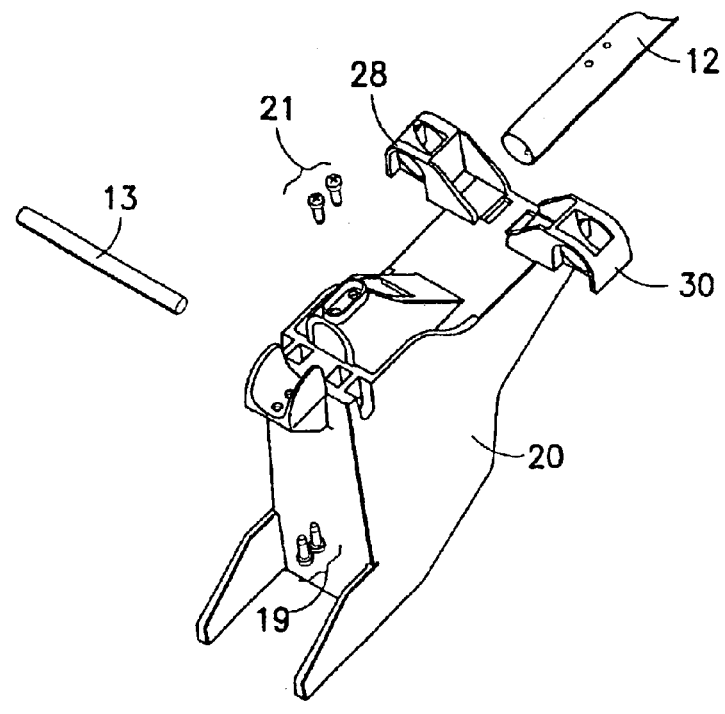

FIGS. 7 and 8 illustrate how the wheels 14, 16 are coupled to the cup 20 with an axle 13 and end caps 15, 17. These figures also show how the shaft 12 is coupled to the cup 20 with interengaging screws 19, 21.

Figure 9:
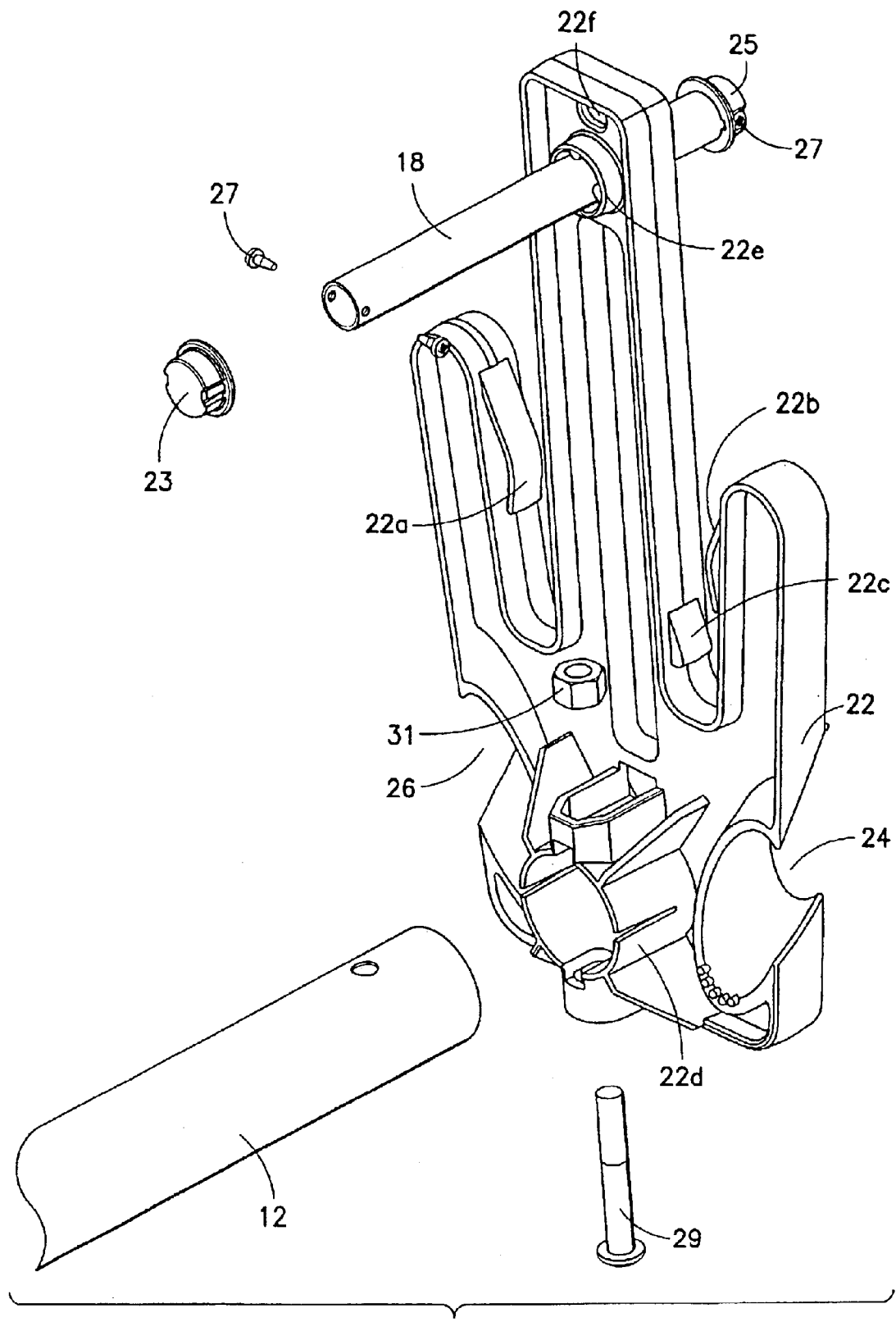
FIG. 9 is a broken exploded perspective view illustrating the handle and W-shaped member assembly.

FIG. 9 illustrates the W-shaped member 22 and handle assembly 18 and their coupling to the shaft 12. The W-shaped member 22 has several engaging fingers (e.g. 22a, 22b, 22c) which frictionally engage skis to secure them in place. The lower portion of the W-shaped member 22 has an engaging collar 22d for coupling to the shaft 12 with the aid of screw 29 and nut 31. An upper central opening 22e engages the sliding handle 18 which is prevented from leaving by caps 23, 25 and screws 27.

Figure 11:
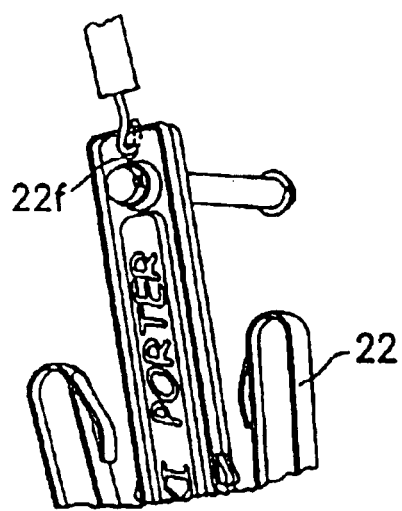
FIG. 11 is an illustration of the shoulder strap coupled to the ski caddy.
Figure 10:
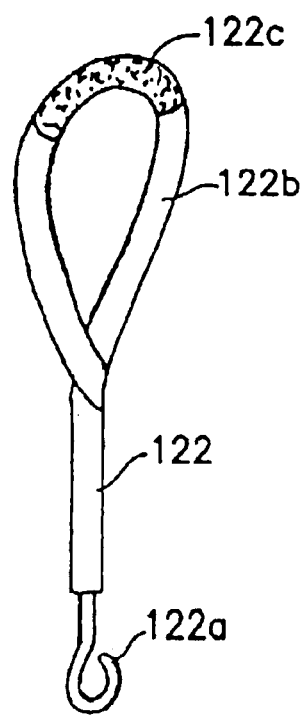
FIG. 10 is an illustration of a shoulder strap suitable for use with the ski caddy.
Figure 12:
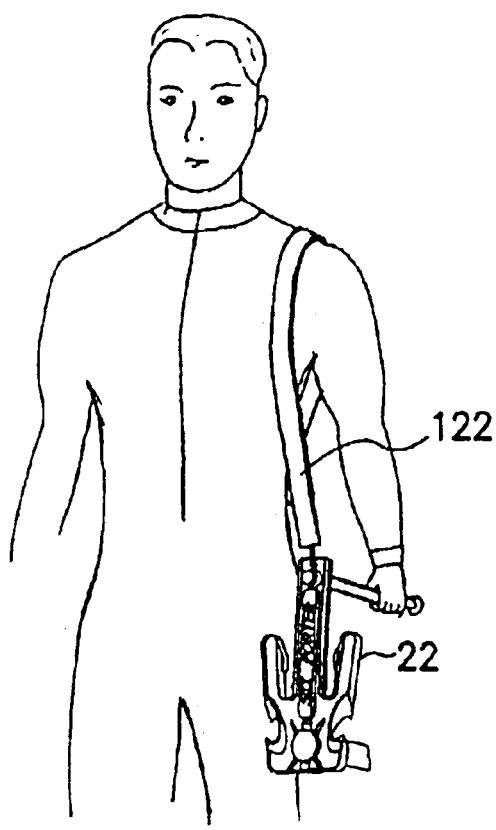
FIG. 12 is an illustration of the ski caddy with shoulder strap in use.

The ski caddy is preferably made of a combination of aluminum and plastic pieces although it could be made of 100% plastic. As shown in FIGS. 10–12, a the W-shaped member 22 is preferably provided with a strap coupling 22f and a shoulder strap 122 is provided. The shoulder strap 122 has a connector 122a at one end and a loop 122b at the other. The loop is preferably padded at 122c where it will rest on a user's shoulder as shown in FIG. 12.

There have been described and illustrated herein a ski caddy. While particular embodiments of the invention have been described, it is not intended that the invention be limited thereto, as it is intended that the invention be as broad in scope as the art will allow and that the specification be read likewise.

It will therefore be appreciated by those skilled in the art that yet other modifications could be made to the provided invention without deviating from its spirit and scope as so claimed.

What is claimed is:

1. An apparatus for transporting ski equipment, said apparatus comprising:

a) a telescoping shaft having a first end and a second end;

b) a pair of wheels coupled to the first end;

c) a handle coupled to the second end;

d) a ski support member coupled to said handle;

e) a pair of ski pole gripping support members coupled to opposite sides of the ski support member, wherein said ski pole gripping support members are configured such that a pair of ski poles supported by said ski pole gripping support members can be rotated from a position substantially parallel to the shaft to a position oblique to said shaft whereby the pair of ski poles are crossed to form a tripod-like structure with said shaft.

2. An apparatus according to claim 1, wherein:

said ski pole gripping support members are configured such that a pair of ski poles supported by said ski pole gripping support members can be rotated through two planes.

3. An apparatus according to claim 1, wherein:

the wheels are substantially bowl shaped.

4. An apparatus according to claim 1, further comprising:

f) a second ski support member located between the wheels.

5. An apparatus according to claim 1, wherein;

said ski support member is substantially W-shaped, said handle is coupled to the top center portion of the ski support, and the bottom center of the ski support is coupled to said second end of said shaft.

6. An apparatus according to claim 1, wherein:

said handle is slidable relative to said ski support member.

7. An apparatus according to claim 1, further comprising:

f) locking means for locking a pair of skis and a pair of ski poles to the apparatus.

8. An apparatus according to claim 7, wherein:

said locking means is also for locking said apparatus to another object.

9. An apparatus according to claim 10, further comprising:

f) a removable shoulder strap.

10. An apparatus for transporting a pair of skis, said apparatus comprising:

a) a telescoping shaft having a first end and a second end;

b) a pair of wheels coupled to said first end;

c) a first ski supporting member coupled between said wheels;

d) a second ski supporting member coupled to said second end; and e) a handle coupled to said second ski supporting member;

wherein said first ski supporting member is substantially U shaped and dimensioned to receive the butt ends of a pair of skis, said second ski supporting member is substantially W-shaped, said handle is coupled to the top center portion of the ski supporting member, and the bottom center of the ski supporting member is coupled to said second end of said shaft.

* * * * *